US008411300B2

(12) United States Patent
Sawayanagi et al.

(10) Patent No.: US 8,411,300 B2
(45) Date of Patent: Apr. 2, 2013

(54) IMAGE PROCESSING APPARATUS AND WORKFLOW EXECUTION SYSTEM, METHOD, AND PROGRAM FOR EXECUTING WORKFLOW BY PROXY IMAGE PROCESSING APPARATUS

(75) Inventors: Kazumi Sawayanagi, Itami (JP); Hironobu Nakata, Itami (JP); Hiroyuki Kawabata, Kawanishi (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1350 days.

(21) Appl. No.: 12/106,870

(22) Filed: Apr. 21, 2008

(65) Prior Publication Data

US 2008/0285073 A1 Nov. 20, 2008

(30) Foreign Application Priority Data

May 18, 2007 (JP) ................. 2007-133523

(51) Int. Cl.
*G06F 3/12* (2006.01)
(52) U.S. Cl. ...................................... 358/1.15
(58) Field of Classification Search .................. None
See application file for complete search history.

(56) References Cited

U.S. PATENT DOCUMENTS

| | | | |
|---|---|---|---|
| 7,515,290 B2 | 4/2009 | Negishi et al. | |
| 2003/0035139 A1* | 2/2003 | Tomita et al. | 358/1.15 |
| 2005/0068547 A1* | 3/2005 | Negishi et al. | 358/1.1 |
| 2005/0213116 A1* | 9/2005 | Uejo | 358/1.1 |

FOREIGN PATENT DOCUMENTS

| | | |
|---|---|---|
| JP | 2003-200637 | 7/2003 |
| JP | 2005-129011 | 5/2005 |
| JP | 2005-150875 | 6/2005 |
| JP | 2005-182418 | 7/2005 |
| JP | 2005-262675 | 9/2005 |
| JP | 2005-275728 | 10/2005 |

OTHER PUBLICATIONS

Japanese Notification of Reasons for Refusal mailed May 26, 2009, directed to counterpart Japanese Patent Application No. 2007-133523; (6 pages).

\* cited by examiner

*Primary Examiner* — Benny Q Tieu
*Assistant Examiner* — Jeremiah Bryar
(74) *Attorney, Agent, or Firm* — Morrison & Foerster LLP

(57) ABSTRACT

In a workflow execution system, work control information for executing a work assigned to one of a plurality of image processing apparatuses connected to a network; workflow execution information indicating which works of a workflow have been executed; and information indicating an image processing apparatus on the next tier, are stored in a portable recording medium. When the work is executed by a proxy image processing apparatus, it is judged from the information stored in the portable recording medium whether or not the work can be executed by the proxy image processing apparatus, and if it can be executed, the work is executed based on the information stored in the portable recording medium. When proxy execution of the work is completed, workflow execution information including the execution result and image information are stored in the portable recording medium and transmitted to the image processing apparatus on the next tier.

14 Claims, 12 Drawing Sheets

IMAGE PROCESSING APPARATUS AND WORKFLOW EXECUTION SYSTEM, METHOD, AND PROGRAM FOR EXECUTING WORKFLOW BY PROXY IMAGE PROCESSING APPARATUS

This application claims priority under 35 U.S.C. §119 to Japanese Patent Application No. 2007-133523 filed on May 18, 2007, the entire disclosure of which is incorporated herein by reference in its entirety.

BACKGROUND OF THE INVENTION

1. Field of the Invention

The present invention relates to a workflow execution system and a workflow execution method that executes one workflow related to image information, by making a plurality of image processing apparatuses such as MFPs (Multi Function Peripherals) connected to a network, execute their own assigned works individually; an image processing apparatus that is capable of executing by proxy, a work supposed to be executed in any of the image processing apparatuses; and a work proxy execution program stored in a computer readable recording medium to make a computer execute the work by proxy.

2. Description of the Related Art

The following description sets forth the inventor's knowledge of related art and problems therein and should not be construed as an admission of knowledge in the prior art.

Conventionally, a plurality of image processing apparatuses such as MFPs, connected to a network, are used in companies, offices and etc. in many cases.

Under such an environment above, a plurality of image processing apparatuses are sometimes arranged to work together to execute one workflow. For example, a first image processing apparatus executes a first work for transmitting image data read out from a document according to an instruction given by a user A, to a second image processing apparatus; the second image processing apparatus executes a second work for biding the received image data to other image data read out from a document according to an instruction given by a user B and transmitting it to a third image processing apparatus; and the third image processing apparatus executes a third work for binding the received image data to yet other image data read out from a document according to an instruction given by a user C and storing it in a predetermined storage.

In this example above, it would be very much preferred such that the user B usually using the second image processing apparatus can makes a different image processing apparatus execute the second work by proxy for the second image processing apparatus, if he/she cannot use the second image processing apparatus due to being away from the office on a business trip, etc., and a new art that makes it possible has been desired.

However, with the conventional arts, an image processing apparatus could not execute by proxy a work supposed to be executed in a different image processing apparatus.

Japanese Unexamined Laid-open Patent Publication No. 2005-182418 discloses an image processing apparatus, wherein if a removable recording medium storing in itself an update program is connected thereto, a control program is updated.

Further, Japanese Unexamined Laid-open Patent Publication No. 2003-200637 discloses an image processing apparatus, wherein a print condition selected among those stored in a memory card is employed.

Further, Japanese Unexamined Laid-open Patent Publication No. 2005-150875 discloses an image processing apparatus, wherein if a USB memory card storing in a setting for an individual user in itself is connected thereto, the setting is implemented instead of a setting stored in the image processing apparatus itself.

However, even with these arts disclosed in the patent publications above, if a plurality of image processing apparatuses are arranged to work together to execute one workflow, another image processing apparatus can not execute by proxy a work assigned to any of the image processing apparatuses. Briefly, these arts do not provide a perfect solution against the issues mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of this present invention to provide a workflow execution system that enables a work assigned to any of a plurality of image processing apparatuses, to be executed by proxy, if the plurality of image processing apparatuses are arranged to work together to execute one workflow related to image information.

It is another objective of this present invention to provide a workflow execution method that enables a work assigned to any of a plurality of image processing apparatuses, to be executed by proxy, if the plurality of image processing apparatuses are arranged to work together to execute one workflow related to image information.

It is yet another objective of this present invention to provide an image processing apparatus that is capable of executing by proxy a work assigned to any of another plurality of image processing apparatuses, if the plurality of image processing apparatuses are arranged to work together to execute one workflow related to image information.

It is still yet another objective of this present invention to provide a work proxy execution program stored in a computer readable recording medium to make the image processing apparatus execute a work by proxy.

According to a first aspect of this present invention, a workflow execution system comprises a plurality of image processing apparatuses that is connected to a network and work together to execute one workflow related to image information by individually executing their own assigned works; and a proxy image processing apparatus that is interconnected to the plurality of image processing apparatuses via the network and executes by proxy a work assigned to any of the plurality of image processing apparatuses, and the proper image processing apparatus supposed to execute its own assigned work, comprising:

a proper apparatus controller that stores in a portable recording medium, work control information for executing a work assigned to the proper image processing apparatus, workflow execution information transmitted from an image processing apparatus on the last tier, which indicates which works of a workflow have been executed, image information transmitted from the image processing apparatus on the last tier, and information indicating an image processing apparatus on the next tier, which executes a work after the present work is executed, and the proxy image processing apparatus comprising:
- a judger that judges from the information stored in the portable recording medium, whether or not the work can be executed;
- a work executor that executes the work by proxy based on the information stored in the portable recording medium, if the judger judges that the work can be executed;
- a proxy apparatus controller that stores in the portable recording medium, workflow execution information including the execution result and image information, after the work execution is completed; and
- a transmitter that transmits the workflow execution information and the image information to the image processing apparatus on the next tier, according to the information indicating the image processing apparatus on the next tier, which is stored in the portable recording medium.

According to a second aspect of this present invention, a workflow execution method comprises:
- storing in a portable recording medium, work control information for executing a work assigned to a proper image processing apparatus that is one of a plurality of image processing apparatuses connected to a network and work together to execute one workflow by individually executing their own assigned works, workflow execution information transmitted from an image processing apparatus on the last tier, which indicates which works of a workflow have been executed, image information transmitted from the image processing on the last tier, and information indicating an image processing apparatus on the next tier, which executes a work after the present work is executed;
- judging from the information stored in the portable recording medium, whether or not a proxy image processing apparatus executing a work by proxy can execute the work;
- executing the work by proxy based on the information stored in the portable recording medium, if it is judged that the proxy image processing apparatus can execute the work;
- storing in the portable recording medium, workflow execution information including the execution result and image information, if the work execution is completed; and
- transmitting the workflow execution information and the image information to the image processing apparatus on the next tier according to the information indicating the image processing apparatus on the next tier, which is stored in the portable recording medium.

According to a third aspect of this present invention, an image processing apparatus executes by proxy any of the works assigned to a respective plurality of image processing apparatuses, if the plurality of image processing apparatuses are connected to a network and work together to execute one workflow related to image information, and comprises:
- a connector that removably connects a portable recording medium storing in itself work control information for executing a work assigned to a proper image processing apparatus, workflow execution information transmitted from an image processing apparatus on the last tier, which indicates which works of a workflow have been executed, image information transmitted from the image processing apparatus on the last tier, information indicating an image processing apparatus on the next tier, which executes a work after the present work is executed;
- a judger that judges from the information stored in the portable recording medium connected to the connector, whether or not the work can be executed;
- a work executor that executes the work by proxy based on the information stored in the portable recording medium, if it is judged that the work can be executed;
- a controller that stores in the portable recording medium, workflow execution information including the execution result and image information, after the work execution is completed; and
- a transmitter that transmits the workflow execution information and the image information to the image processing apparatus on the next tier, according to the information indicating the image processing apparatus on the next tier, which is stored in the portable recording medium.

According to a fourth aspect of this present invention, a work proxy execution program is stored in a computer readable recording medium to make a computer of an image processing apparatus executing by proxy any of the works assigned to a respective plurality of image processing apparatus, if the plurality of image processing apparatuses are connected to a network and work together to execute one workflow, execute:
- judging whether or not the work can be executed, from information stored in a portable recording medium, which are work control information for executing a work assigned to a proper image processing apparatus, workflow execution information transmitted from an image processing apparatus on the last tier, which indicates which works of a workflow have been executed, image information transmitted from the image processing apparatus on the last tier, and information indicating an image processing apparatus on the next tier, which executes a work after the present work is executed;
- executing by proxy the work based on the information stored in the portable recording medium, if it is judged the work can be executed;
- storing in the portable recording medium, workflow execution information including the execution result and image information, after the work execution is completed; and
- transmitting the workflow execution information and the image information to the image processing apparatus on the next tier, according to the information indicating the image processing apparatus on the next tier, which is stored in the portable recording medium.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
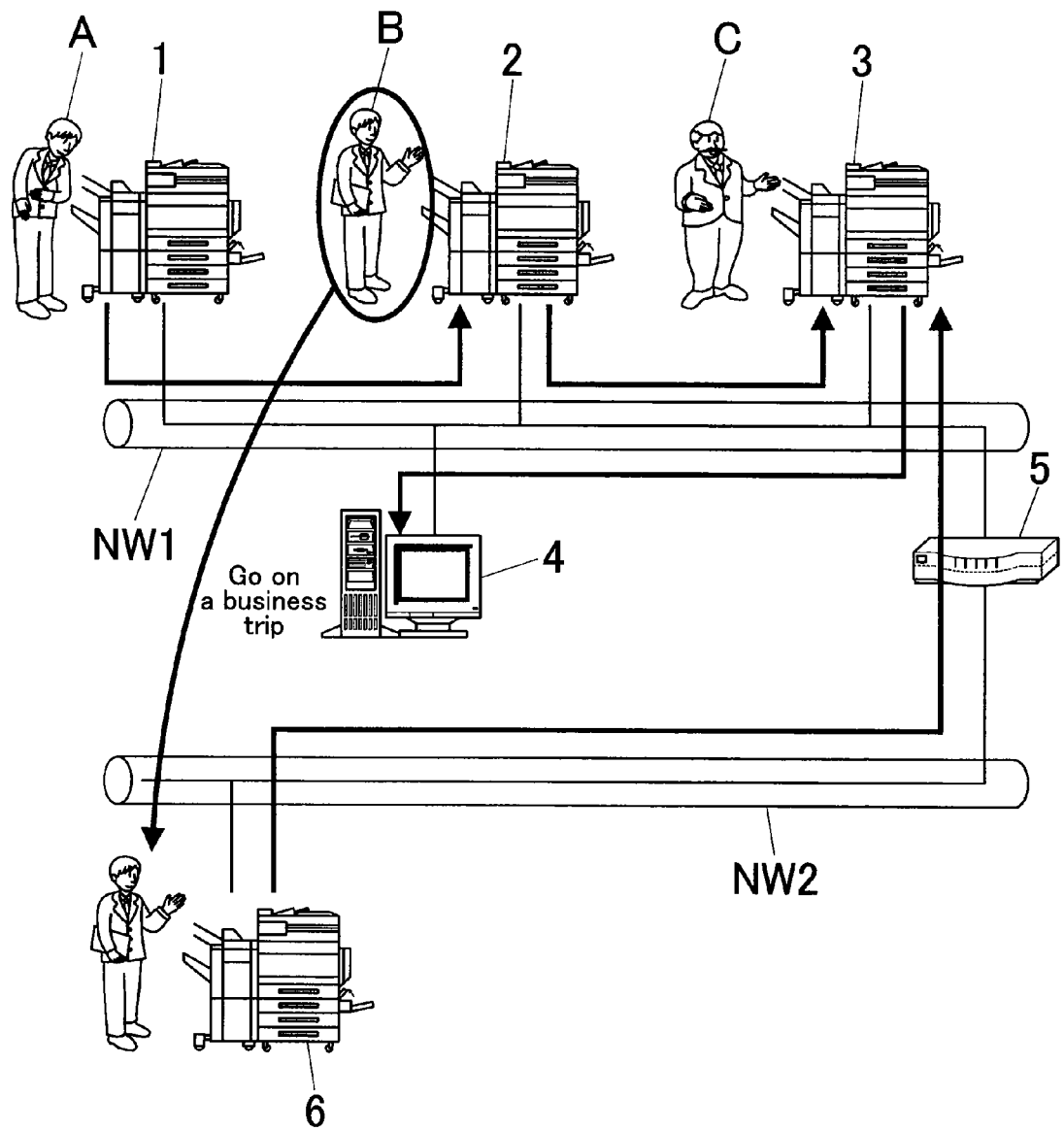
FIG. 1 is a view showing a configuration of a workflow execution system according to one embodiment of this present invention.

FIG. 1 is a view showing a configuration of a workflow execution system according to one embodiment of this present invention.

As shown in FIG. 1, this workflow execution system comprises MFPs 1, 2 and 3 that are a plurality of image processing apparatuses (for example, three in this embodiment), and the server 4, which are interconnected via a first network NW 1 that is a LAN for example.

And a second network NW 2 that is also a LAN for example is connected to the first network NW 1 via a router 5. A MFP 6 that is another image processing apparatus is connected to the network NW 2.

In this workflow execution system, the MFPs 1, 2 and 3 are usually arranged to work together to execute one workflow, meanwhile a user makes the MFP 6 that is another image processing apparatus execute a work by proxy if he/she cannot use the MFPs 1, 2 or 3 due to being away from the office on a business trip, etc.

In this embodiment, a workflow is defined as a series of individual works sequentially executed in this workflow execution system.

This workflow consists of "entire control information" for controlling execution of the entire workflow and "work control information" for controlling execution of the individual works.

When a workflow is executed from its upstream (the former tier) toward its down stream (the latter tier) (as indicated by the black bold arrow in FIG. 1), the "workflow execution information" indicating and administering which works of a workflow have been executed and the "image information" generated in respective works of the workflow are used.

For example, a workflow is as described below. Usually, respective works of a workflow are sequentially executed under control in the MFP 1, MFP 2 and MFP 3, in this order.

The "entire control information" is defined as information for controlling execution of the entire workflow consisting of the three following works (1), (2) and (3), and the "work control information" is defined as information for controlling execution of the respective works.

(1) The MFP 1 reads out image information from a document according to an instruction given by the user A and transmits workflow execution information and the readout image information to the MFP 2 in the next tier.

(2) The user B using the MFP 2 examines an execution result obtained by the user A. And the MFP 2 gives to the image information received from the MFP 1, other mage information read out in the MFP 2 itself according to an instruction given by the user B, and transmits workflow execution information and the image information to the MFP 3 in the next tier.

(3) The user C using the MFP 3 examines execution results obtained by the users A and B. And the MFP 3 gives to the received image information, yet other image information read out in the MFP 3 itself according to an instruction given by the user C, and transmits workflow execution information and the image information to the server 4 and stores therein.

The "entire control information" and "work control information" are retained in the server 4. And linkage information directing to the "entire control information" is retained in the MFPs 1, 2 and 3 that relate to the workflow. When the respective works are executed, the "work control information" is downloaded from the server 4 to the respective MFPs 1, 2 and 3.

Figure 2:
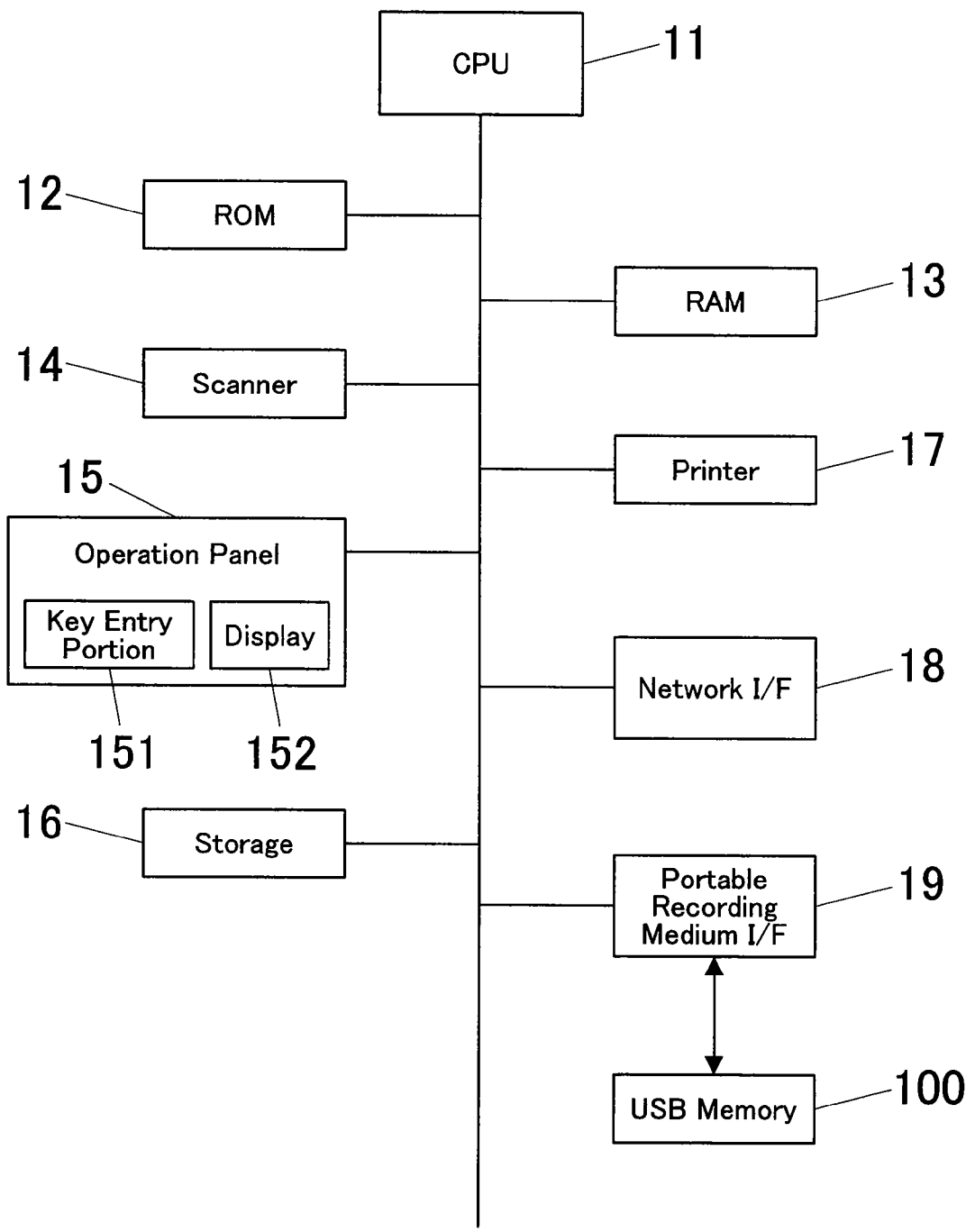
FIG. 2 is a block diagram schematically showing a configuration of an image processing apparatus used in the workflow execution system.
Figure 3A:
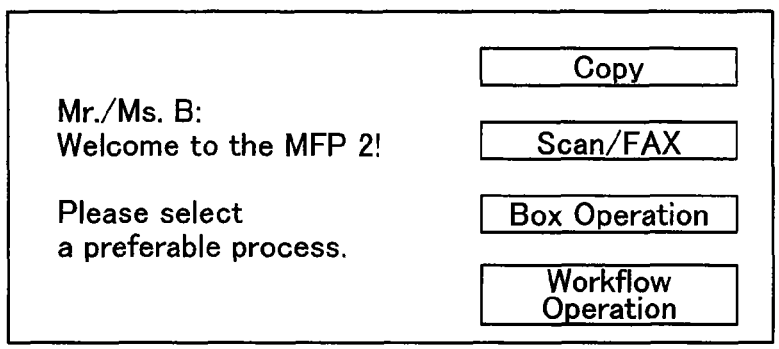
FIG. 3 is a screen transition diagram showing screens that are displayed on the display when necessary data is copied into a portable recording medium from a proper image processing apparatus.
Figure 3B:
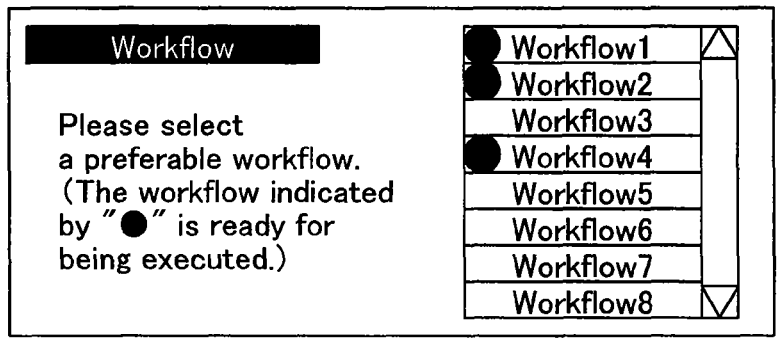
Figure 3C:
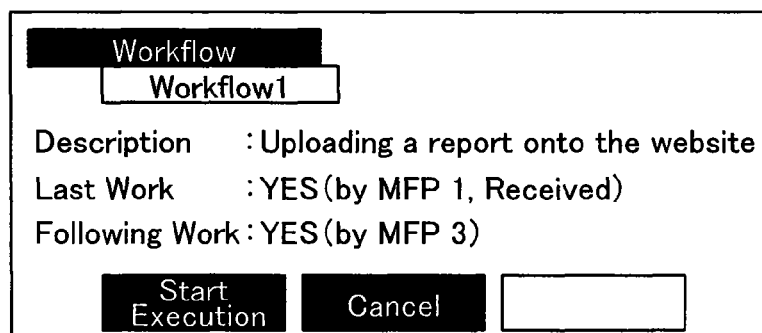
Figure 3D:
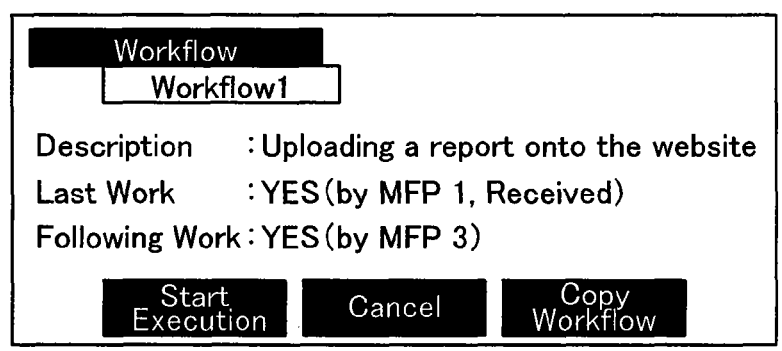
Figure 3E:
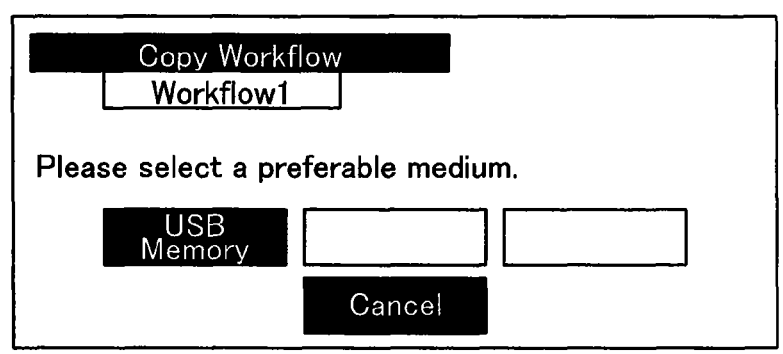
Figure 4F:
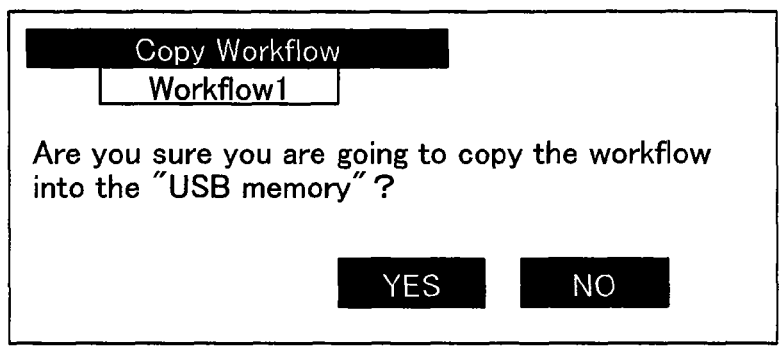
FIG. 4 is a screen transition diagram continued from FIG. 3.
Figure 4G:
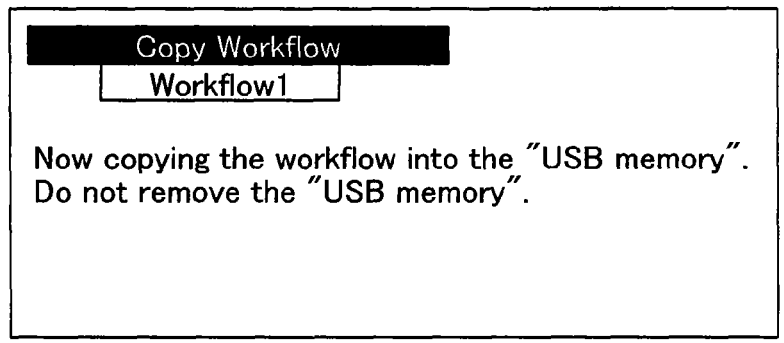
Figure 4H:
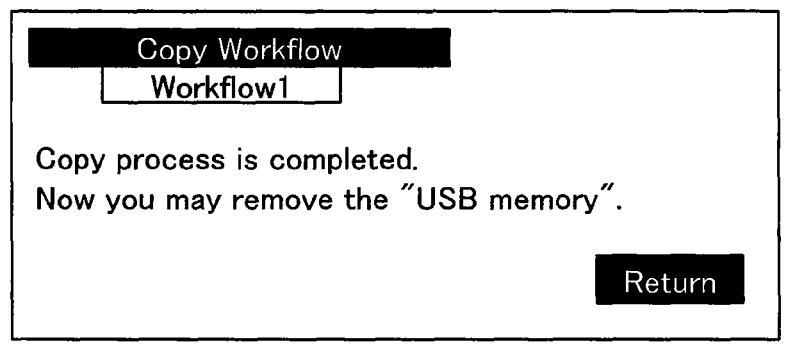
Figure 4I:
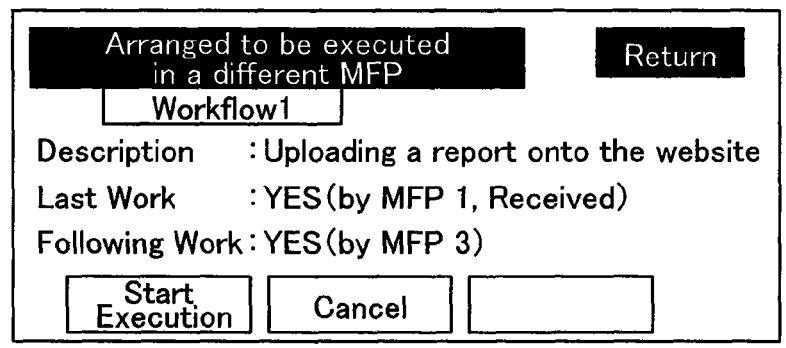
Figure 4J:
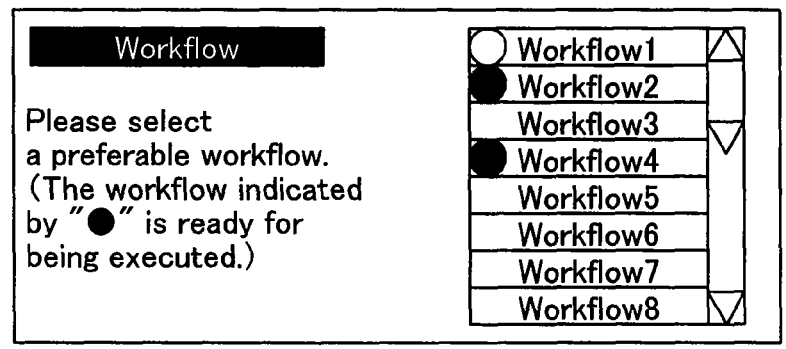
Figure 5A:
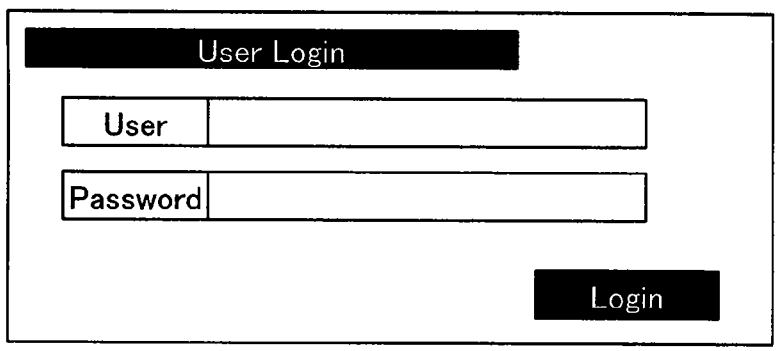
FIG. 5 is a screen transition diagram showing screens that are displayed when a proxy image processing apparatus executes a work by proxy.
Figure 5B:
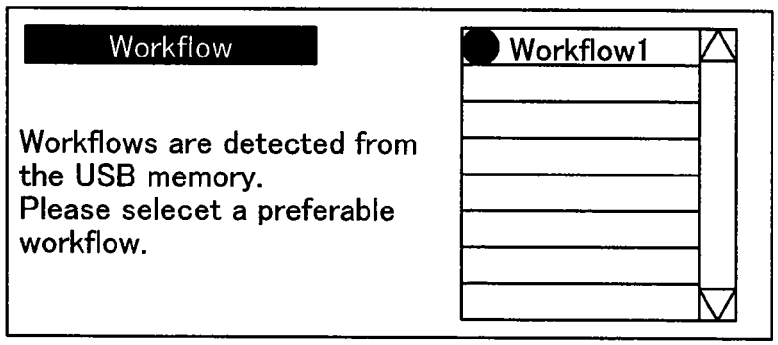
Figure 5C:
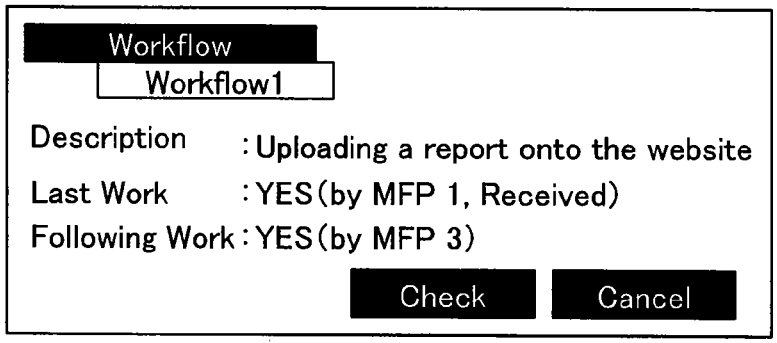
Figure 5D:
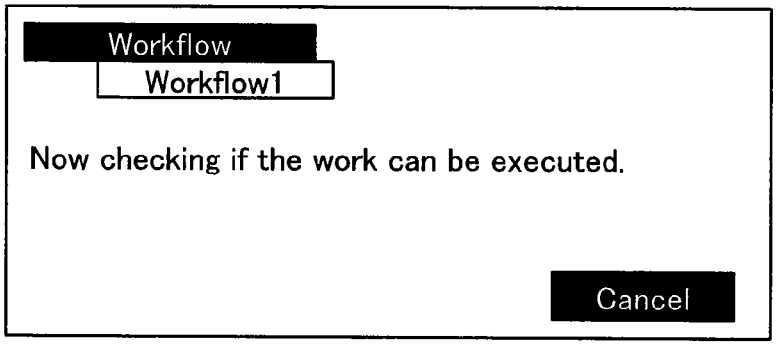
Figure 5E:
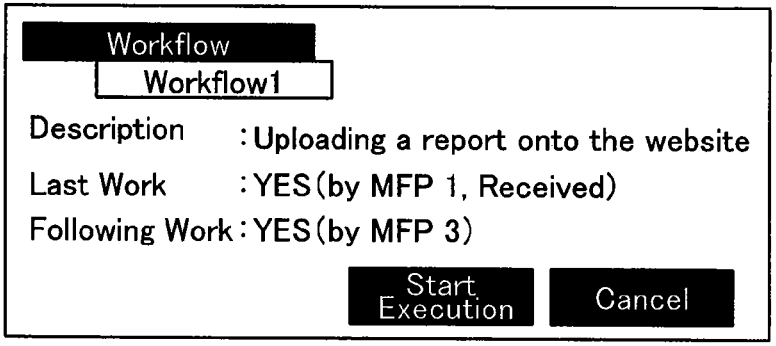
Figure 6F:
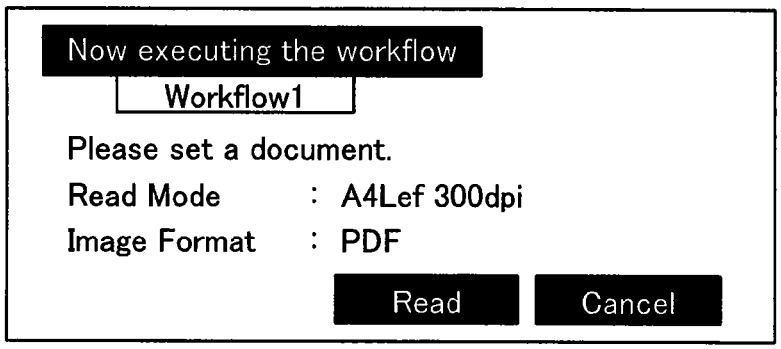
FIG. 6 is a screen transition diagram continued from FIG. 5.
Figure 6G:
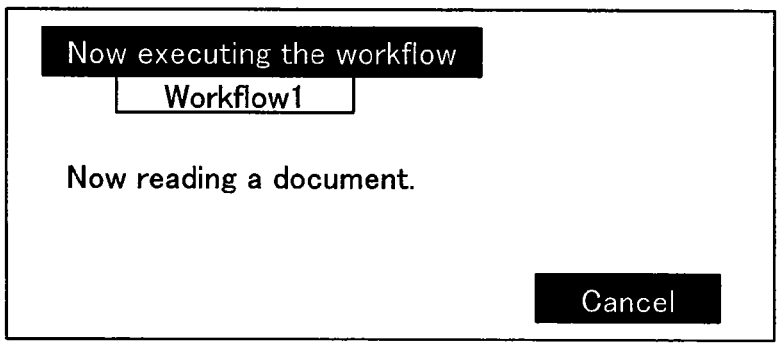
Figure 6H:
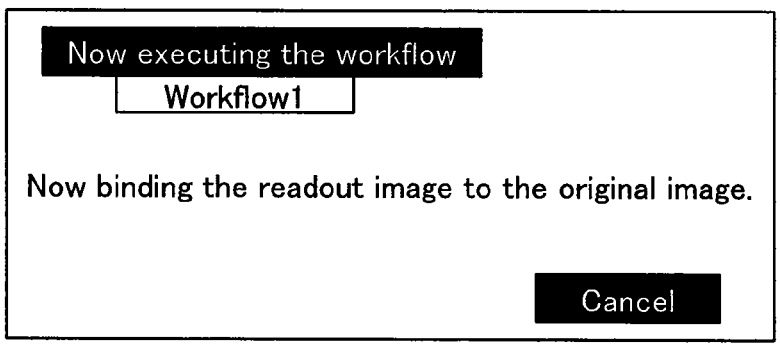
Figure 6I:
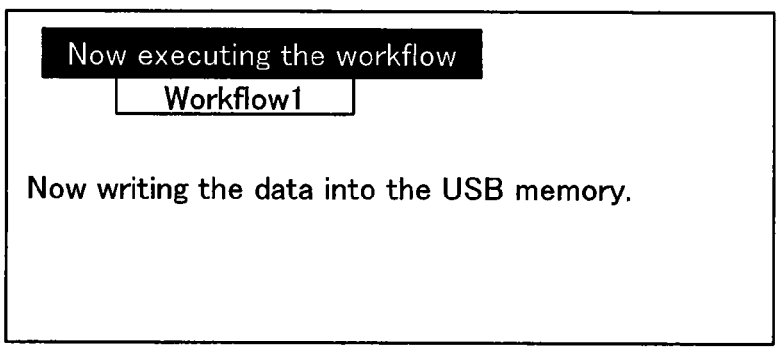
Figure 6J:
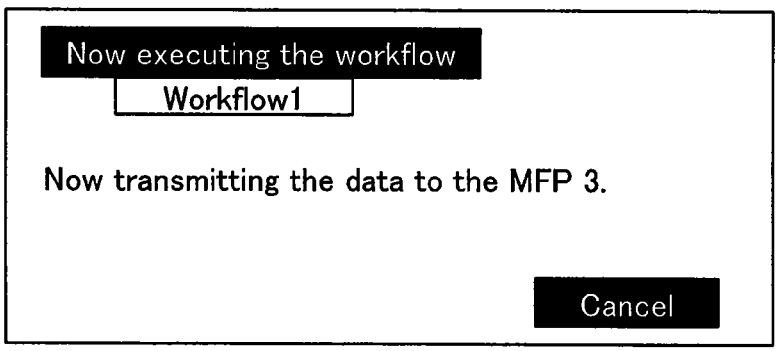

FIG. 2 is a block diagram schematically showing a configuration of the MFP 2. Since the MFPs 1, 3 and 6 have the same configuration as the MFP 2, explanation thereof is omitted.

As shown in FIG. 2, the MFP 2 comprises a CPU 11, a ROM 12, a RAM 13, a scanner 14, an operation panel 15, a storage 16, a printer 17, a network interface (hereinafter "interface" will be referred to as "I/F") 18, a portable recording medium I/F 19 and etc.

The CPU 11 centrally controls all the operations performed in the MFP 2, and regularly controls to implement the copy function, the print function, the scan function, the facsimile function and etc. Further, the CPU 11 makes the MFPs 1, 2 and 3 execute the works (1), (2) and (3), respectively, and makes the MFP 6 execute by proxy, any of the works assigned to the MFPs 1, 2 and 3.

The ROM 12 is a memory that stores in itself an operation program for the CPU 11 and other data. The RAM 13 is a memory that provides an operation area for the CPU 11 to execute the program.

The scanner 14 reads out image data from a document placed on a platen glass or a document feeder, then outputs the image data.

The operation panel 15 performs various entry operations and displays various messages and operation screens on itself. And it comprises a key entry portion 151 having numeric keys and etc., and a display 152 that is a crystal liquid touch panel or etc.

The storage 16 stores in itself log information related to a workflow execution, other data, applications and etc., and it is such as a hard disk drive or etc.

The printer 17 outputs and prints on sheets image data read out by the scanner 14 or received from an external apparatus such as one of the other MFPs.

The network I/F 18 functions as a communicator that exchanges data with an external apparatus.

The portable recording medium I/F 19 is removably connected to a portable recording medium such as a USB memory 100, and enables data to be written (stored) in the USB memory 100 and read out from the USB memory 100.

In the workflow system shown in FIG. 1, the user B intends to make the MFP 6 that is a proxy image processing apparatus, not the MFP 2, execute a work due to being away from the office on a business trip. Hereinafter, a procedure to execute a workflow in this case right above will be explained.

(1) The user B inserts the USB memory 100 into the portable recording medium I/F 19 of the MFP 2 that is a proper image processing apparatus. And he/she selects "workflow" via the display of the operation panel 15 and gives an instruction to copy information into the USB memory 100.

(2) According to the instruction given by the user B, under the control of the CPU 11 of the MFP 2, information necessary to execute a work supposed to be executed in the MFP 2, in other word, workflow execution information received from the MFP 1 on the last tier, which indicates which works of a workflow have been executed (in this embodiment, only the work assigned to the MFP 1 has been executed); image information also received from the MFP 1; and work control information of the MFP 2, are stored in the USB memory 100.

If the workflow execution information and image information are not yet transmitted from the MFP 1 on the last tier, linkage information directing to a storage location of the information to be transmitted is written therein. And thereby, the user B can go on a business trip without the need of waiting until the workflow execution information and etc. are transmitted from the MFP 1, meanwhile he/she can obtain the workflow execution information and etc. by making an access to the storage location of the MFP 1 from the MFP 6 away from the office according to the linkage information.

(3) Further, under the control of the CPU 11 of the MFP 2, a condition for obtaining log information is obtained from setting information then stored in the USB memory 100.

(4) The user B removes the USB memory 100 from the MFP 2 then leaves the office carrying it with him/her. And he/she inserts the USB memory 100 into the portable recording medium I/F 19 of the MFP 6 that is a proxy image processing apparatus, away from the office on a business trip. Then, the user B gives an instruction to execute a work that is supposed to be executed in the MFP 2 and stored in the USB memory 100, via the operation panel 15.

(5) Under the control of the CPU 11 of the MFP 6 that is a proxy image processing apparatus, the workflow execution information, the image information and the work control information are read out from the USB memory 100, then it is judged whether or not the work can be executed. Concretely, for example if the MFP 6 supports only black and white colors and the other work executed in the MFP 1 on the last tier is reading a full-color image, then it is judged that the work cannot be executed in the MFP 6.

(6) If it is judged that the work can be executed, under the control of the CPU 11 of the MFP 6 that is a proxy image processing apparatus, the work is executed. In this embodiment, a document is read by the scanner 14, image information read out from the document is given to (bound to) the other image information received from the MFP 1. Then, log information is obtained according to the condition for obtaining log information, which is stored in the USB memory 100, then the log information is stored in the USB memory 100.

(7) Further, under the control of the CPU 11 of the MFP 6 that is a proxy image processing apparatus, workflow execution information including a work execution result and image information are stored in the USB memory 100.

(8) After that, under the control of the CPU 11 of the MFP 6, the workflow execution information and the image information are transmitted to the MFP 3 that is to execute a following work.

(9) If the workflow execution information and the image information are successfully transmitted from the MFP 6 to the MFP 3, under the control of the CPU 11 of the MFP 6, the workflow execution information, the image information and the work control information stored in the USB memory 100 are deleted. Those information can be restored therein instead of being deleted, although deleting those information would ensure higher security,

(10) The user B removes the USB memory 100 from the MFP 6 and returns to the office from a business trip. And if he/she reconnects the USB memory 100 to the MFP 2, under the control of the CPU 11 of the MFP 2, log information of the work executed by proxy in the MFP 6, which is stored in the USB memory 100, is copied into a usual log storage location.

As described above in this embodiment, if a work supposed to be executed in the MFP 2 is intended to be executed in the MFP 6 that is a proxy image processing apparatus, workflow execution information indicating the works having been executed, image information and work control information are copied into the USB memory 100, meanwhile the work is executed in the MFP 6 that is a proxy image processing apparatus based on the information stored in the USB memory 100. In this way, the work is successfully executed by proxy without interrupting the entire workflow execution.

Further, workflow execution information, image information and etc. are conveyed via the USB memory 100, not via the networks NW 1 or NW 2, which would prevent the risk of leaking image information and etc. on the network NW 1 or NW 2, and ensure higher security.

Further, a work is executed by proxy based on the information stored in the USB memory, which would prevent execution information from being unnecessarily retained in the hard disk drive of the MFP 6 that is a proxy apparatus, and ensure higher security.

Hereinafter, screens that are displayed on the display 152 of the operation panel 15 when the user B gives an instruction to copy various information into the USB memory 100 from the MFP 2 that is a proper image processing apparatus, will be explained with reference to FIG. 3 and FIG. 4.

If the user B logins after authentication, a screen for selecting a process among those (copy, scan/FAX, BOX operation and workflow operation) to execute, is usually displayed on the display 152, as shown in FIG. 3 (A).

Then if the user B presses a button "workflow operation", the screen is switched to another screen for selecting a workflow to execute, as shown in FIG. 3 (B). In this screen, workflows ready for being executed are indicated by the black dots, for example.

Then if the user B selects a workflow to execute (for example, he/she selects "Workflow 1"), the screen is switched to another screen in which a brief description of the work to be executed by proxy, and whether or not there exist a work having been executed in the MFP 1 on the last tier and a work to be executed in the MFP 3 in the next tier, are displayed as shown in FIG. 3 (C). A "start execution" button and a "cancel" button are also displayed in this screen.

Then if the user B presses the "start execution" button, the screen is switched to another screen in which a "copy workflow" button is additionally displayed as shown in FIG. 3 (D).

Then if the user B presses the "copy workflow" button, the screen is switched to another screen for selecting a medium (recording medium) that is a copy destination, as shown in FIG. 3 (E). And a "USB memory" button is displayed in this screen.

Then if the user B presses the "USB memory" button, the screen is switched to another screen in which a message is displayed to confirm whether or not to copy the workflow in the USB memory, as shown in FIG. 4 (F). A "YES" button and a "NO" button are also displayed in this screen, so that the user could answer for the message.

Then if the user B presses the "YES" button, the screen is switched to another screen in which a message is displayed to let the user know that work control information of the work supposed to be executed in the MFP 2, workflow execution information received from the MFP 1, image information received from the MFP 1, and information of the MFP 3 in the next tier, are now being copied into the USB memory 100, as shown in FIG. 4 (G). And if those are completely copied into the USB memory 100, the screen is switched to another screen in which a message is displayed to let the user know the copy process is completed and now he/she may remove the USB memory, as shown in FIG. 4 (H).

Then if the user B removes the USB memory 100 from the MFP 2 and presses a "return" button, the screen is switched to another screen in which a message is displayed to let the user know that the work is arranged to be executed in the MFP 6 that is a proxy image processing apparatus, as shown in FIG. 4 (I).

Then if the user B further presses the "return" button, the screen is switched to another screen for selecting a workflow as shown in FIG. 4 (J). In this screen, the "Workflow 1" selected in the first step, is now indicated by the white dot, not the black dot, and thereby the user knows that it is a work arranged to be executed by proxy.

Hereinafter, screens that are displayed on the display 152 of the operation panel 15 when a workflow is executed in the MFP 6 that is a proxy image processing apparatus, will be explained with reference to FIG. 5 and FIG. 6

If the user B inserts the USB memory 100 into the portable recording medium I/F 19 of the MFP 6 that is a proxy image processing apparatus, a login screen is displayed on the display 152 of the operation panel 15 of the MFP 6 as shown in FIG. 5 (A).

Then if the user B enters his/her user name and password, a message is displayed thereon to let the user know that workflows are detected from the USB memory 100 connected to the MFP 6, as shown in FIG. 5 (B). And the screen is switched to another screen for selecting a workflow to execute.

Then if the user B selects a workflow (for example, he/she selects "Workflow 1"), the screen is switched to another screen introducing the "Workflow 1" as shown in FIG. 5 (C). That is, a brief description of the work to be executed by proxy, and whether or not there exist a work having been executed in the MFP 1 on the last tier and a work to be executed in the MFP 3 on the next tier, are displayed in this screen. A "check" button and a "cancel" button are also displayed in this screen.

Then if the user B presses the "check" button, the screen is switched to another screen in which a message is displayed to let the user know that it is now being checked whether or not the work can be executed, as shown in FIG. 5 (D). If the check is completed, the screen is switched to another screen for selecting whether or not to start executing the work, as shown in FIG. 5 (E). A "start execution" button and a "cancel" button are also displayed in this screen.

Then if the user B presses the "start execution" button, the screen is switched to another screen of "now executing the workflow" as shown in FIG. 6 (F). In this screen, a message is displayed to request the user to place a document. Further, a read mode, an image format, a "read" button and a "cancel" button are also displayed therein.

Then if the user B presses the "read" button, the screen is switched to another screen in which a message is displayed to let the user know that a document is now being read, as shown in FIG. 6 (G).

Then if the document is completely read, the screen is switched to another screen in which a message is displayed to let the user know that an image read out from the document is now being bound to an original image, as shown in FIG. 6 (H).

Then if the readout image is completely bound to the original image, the screen is switched to another screen in which a message is displayed to let the user know that log information and workflow execution information including the execution result, image information and etc. are now being written in the USB memory 100, as shown in FIG. 6 (I). And if those are completely written, the screen is switched to another screen in which a message is displayed to let the user know that the workflow execution information, the image information and etc. are now being transmitted to the MFP 3 on the next tier, as shown in FIG. 6 (J).

Figure 7K:
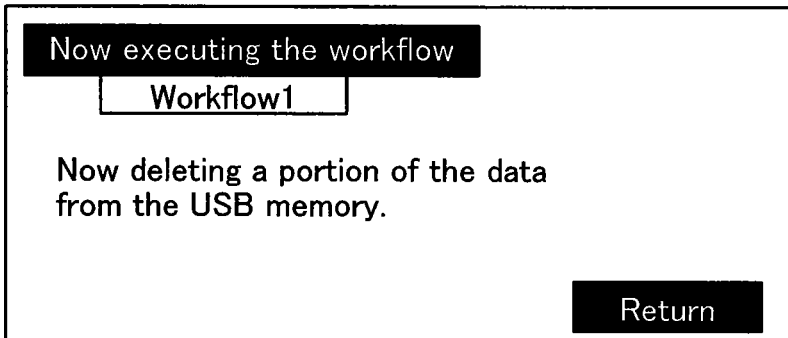
FIG. 7 is a screen transition diagram continued from FIG. 6.
Figure 7L:
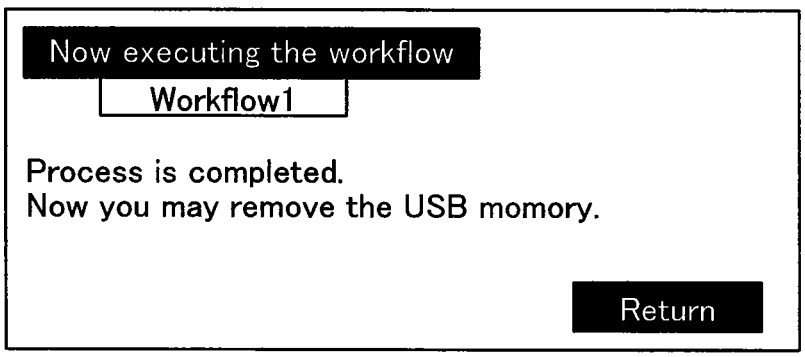

Then if those are completely transmitted to the MFP 3, the screen is switched to another screen in which a message is displayed to let the user know that the workflow execution information, the image information and the work control information stored in the USB memory 100 are now being deleted, as shown in FIG. 7 (K). In this regard, it can be configured such that the user selects whether or not to delete those information.

Then if data deletion is completed, the screen is switched to another screen in which a message is displayed to let the user know that the process is completed and now he/she may remove the USB memory 100, as shown in FIG. 7 (L).

Figure 8:
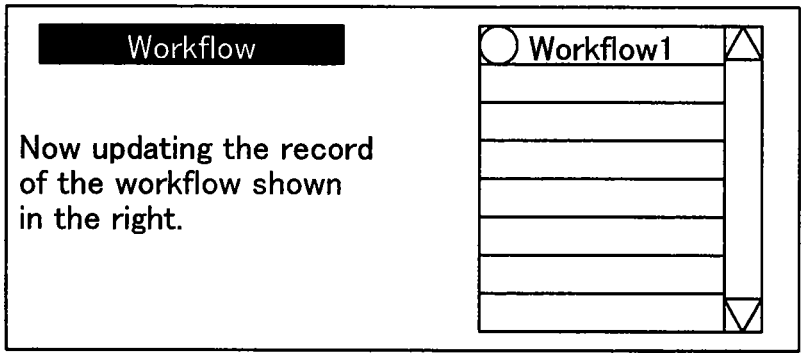
FIG. 8 shows a screen displayed when log information is returned to the proper image processing apparatus after the proxy image processing apparatus executes a work by proxy.

Meanwhile, the user B returns to the MFP 2 that is a proper image processing apparatus. And if he/she connects the USB memory 100 to the portable recording medium I/F 19, under the control of the CPU 11 of the MFP 2, the record of the "Workflow 1" stored in a log information storage area of the storage 16 is started to be updated based on the log information stored in the USB memory 100. At the same time, a message is displayed on the display 152 of the operation panel 15 to let the user know that the record of the "Workflow 1" is now being updated, as shown in FIG. 8. In this embodiment, log information is obtained from the MFP 6 that is a proxy image processing apparatus, according to the condition for obtaining log information, which originates from the MFP 2 that is a proper image processing apparatus. And thereby, the same log information as that supposed to be obtained if the work were executed in the MFP 2, is recorded.

Figure 9:
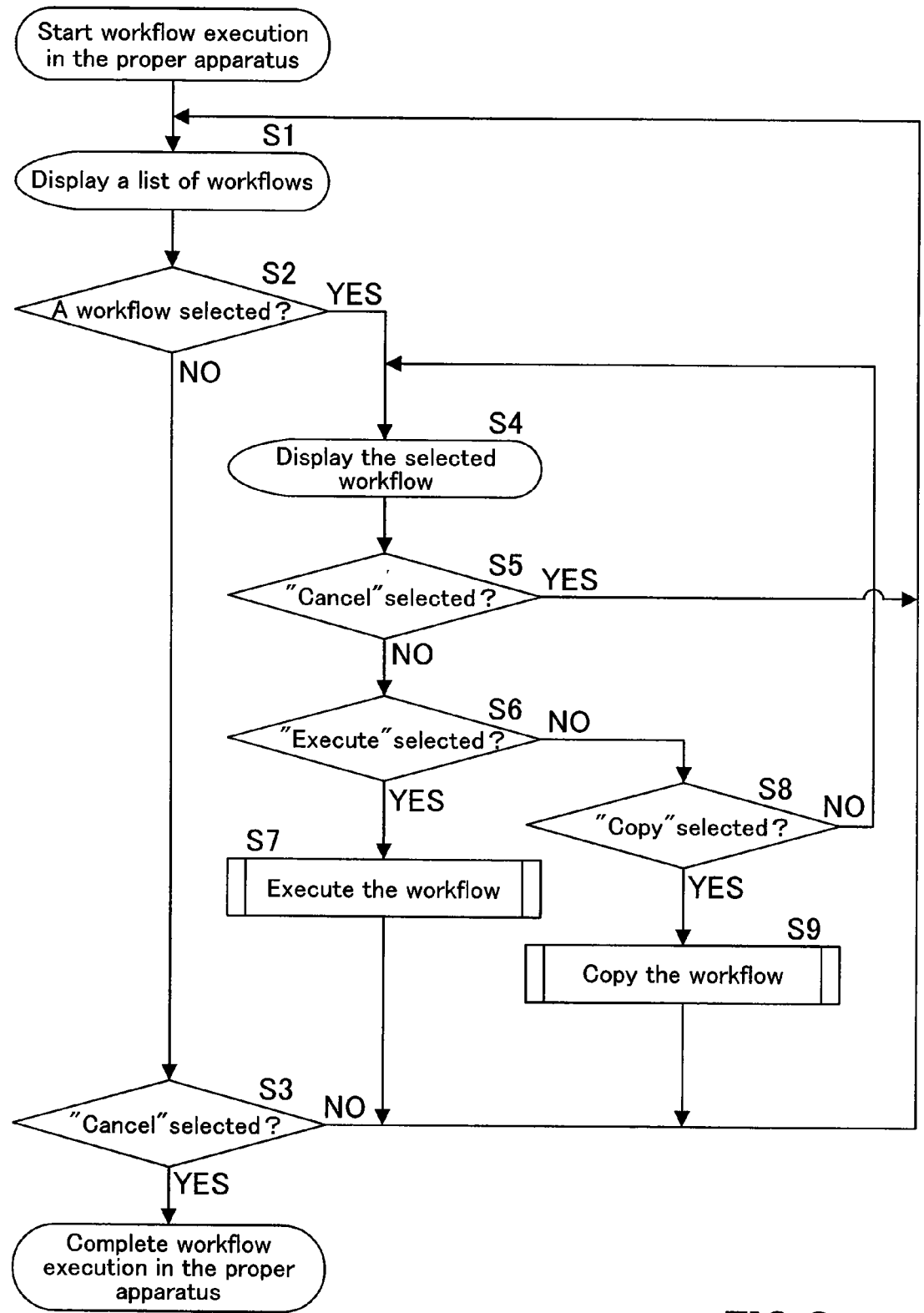
FIG. 9 is a flowchart showing a procedure executed in the proper image processing apparatus, to start executing a workflow.

FIG. 9 is a flowchart showing a procedure executed in a proper image processing apparatus (the MFP 2) to start executing a workflow. This procedure is executed by the CPU 11 of the MFP 2 according to a program stored in a recording medium such as the ROM 12.

As shown in FIG. 9, a list of workflows is displayed on the display 152 in Step S1. And it is judged in Step S2 whether or not a workflow is selected from the list. If a workflow is not selected (NO in Step S2), then it is judged in Step S3 whether or not "cancel" is selected. If "cancel" is selected (YES in Step S3), the routine terminates. If "cancel" is not selected (NO in Step S3), the routine returns to Step S1.

If a workflow is selected from the list (YES in Step S2), the selected workflow is displayed in Step S4, and it is judged in Step S5 whether or not "cancel" is selected.

If "cancel" is selected (YES in Step S5), the routine returns to Step S1. If "cancel" is not selected (NO in Step S5), then it is judged in Step S6 whether or not "execute" is selected. If "execute" is selected (YES in Step S6), the workflow is executed in Step S7, and then the routine returns to Step S1. If "execute" is not selected (NO in Step S6), the routine proceeds to Step S8.

In Step S8, it is judged whether or not "copy" is selected. If "copy" is not selected (NO in Step S8), the routine returns to Step S4. If "copy" is selected (YES in Step S8), the workflow is copied in Step S9, and then the routine returns to Step S1.

Figure 10:
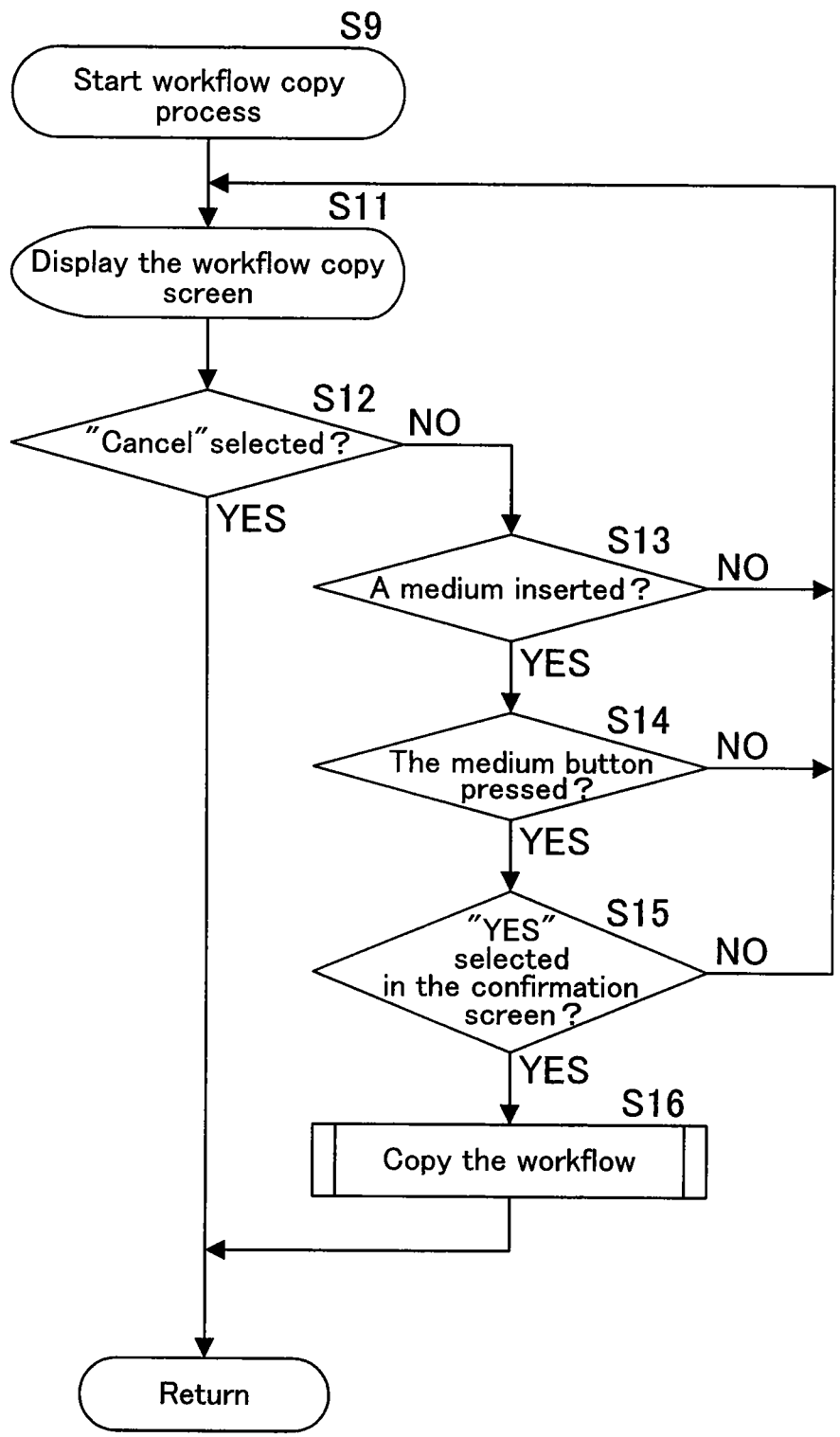
FIG. 10 is a flowchart showing a subroutine of a workflow copy process (Step S9) of FIG. 9.

FIG. 10 is a flowchart showing a subroutine that corresponds to the workflow copy process (Step S9).

As shown in FIG. 10, the workflow copy screen (FIG. 3 (E)) is displayed in Step S11. And it is judged in Step S12 whether or not "cancel" is selected. If "cancel" is selected (YES in Step S12), the subroutine returns.

If "cancel" is not selected (NO in Step S12), then it is judged in Step S13 whether or not the medium (the USB memory) 100 is inserted. If the medium 100 is not inserted (NO in Step S13), the subroutine returns to Step S11. If the medium 100 is inserted (YES in Step S13), a medium button is displayed and it is judged whether or not the button is pressed, in Step S14.

If the medium button is not pressed (NO in Step S14), the subroutine returns to Step S11. If the medium button is pressed (YES in Step S14), then it is judged in Step S15 whether or not "YES" is selected in the confirmation screen of FIG. 4 (F). If "YES" is not selected in the confirmation screen (NO in Step S15), the subroutine returns to Step S11. If "YES" is selected in the confirmation screen (YES in Step S15), the workflow is copied into the medium 100 in Step S16, and then the subroutine returns.

Figure 11:
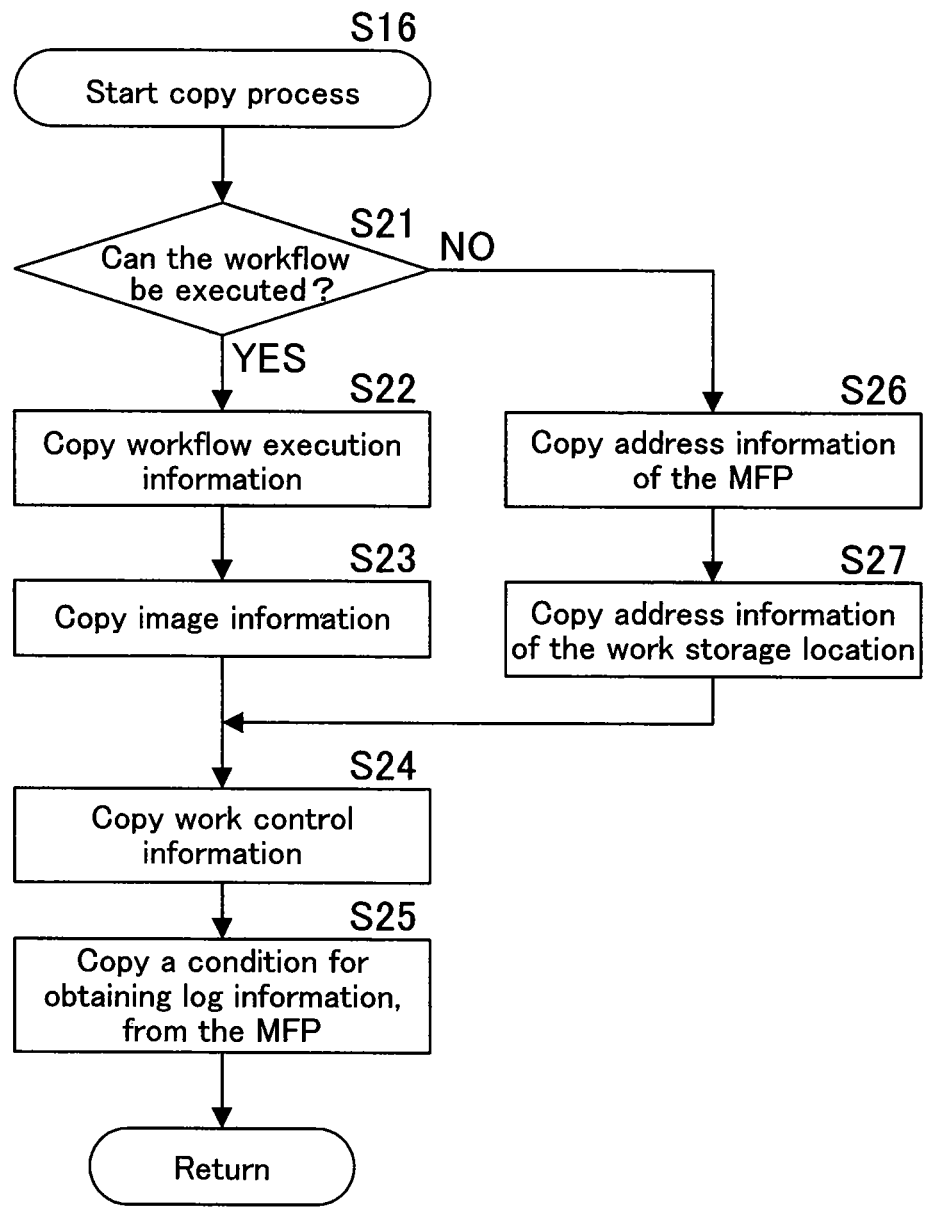
FIG. 11 is a flowchart showing a subroutine of a copy process (Step S16) of FIG. 10.

FIG. 11 is a flowchart showing a subroutine that corresponds to the copy process (Step S16).

As shown in FIG. 11, it is judged in Step S21 whether or not the workflow can be executed, in other words, workflow execution information and image information are received from the MFP 1. If the workflow can be executed, in other words, workflow execution information and etc. are received (YES in Step S21), the workflow execution information is copied in Step S22, and the image information received from the MFP 1 is copied in Step S23. Then, work control information is copied in Step S24, and a condition for obtaining log information is copied from the MFP 2 in Step S25, and then the subroutine returns.

If the workflow cannot be executed, in other words, workflow execution information and etc. are not yet received (NO in Step S21), address information of the MFP 2 is copied as linkage information in Step S26, and address information of a work storage location is copied as linkage information in Step S27. And then, the subroutine proceeds to Step S24.

As described above in this embodiment, address information of the MFP 2 and a work storage location are stored in the USB memory 100. Therefore, even if workflow execution information and etc. are not copied into the USB memory 100 from the MFP 2 because those information are not yet transmitted from the MFP 1, workflow execution information and etc. to be transmitted to the MFP 2 later will be obtained by making access to the work storage location of the MFP 2 according to the linkage information, from the MFP 6 that is a proxy image processing apparatus.

Figure 12:
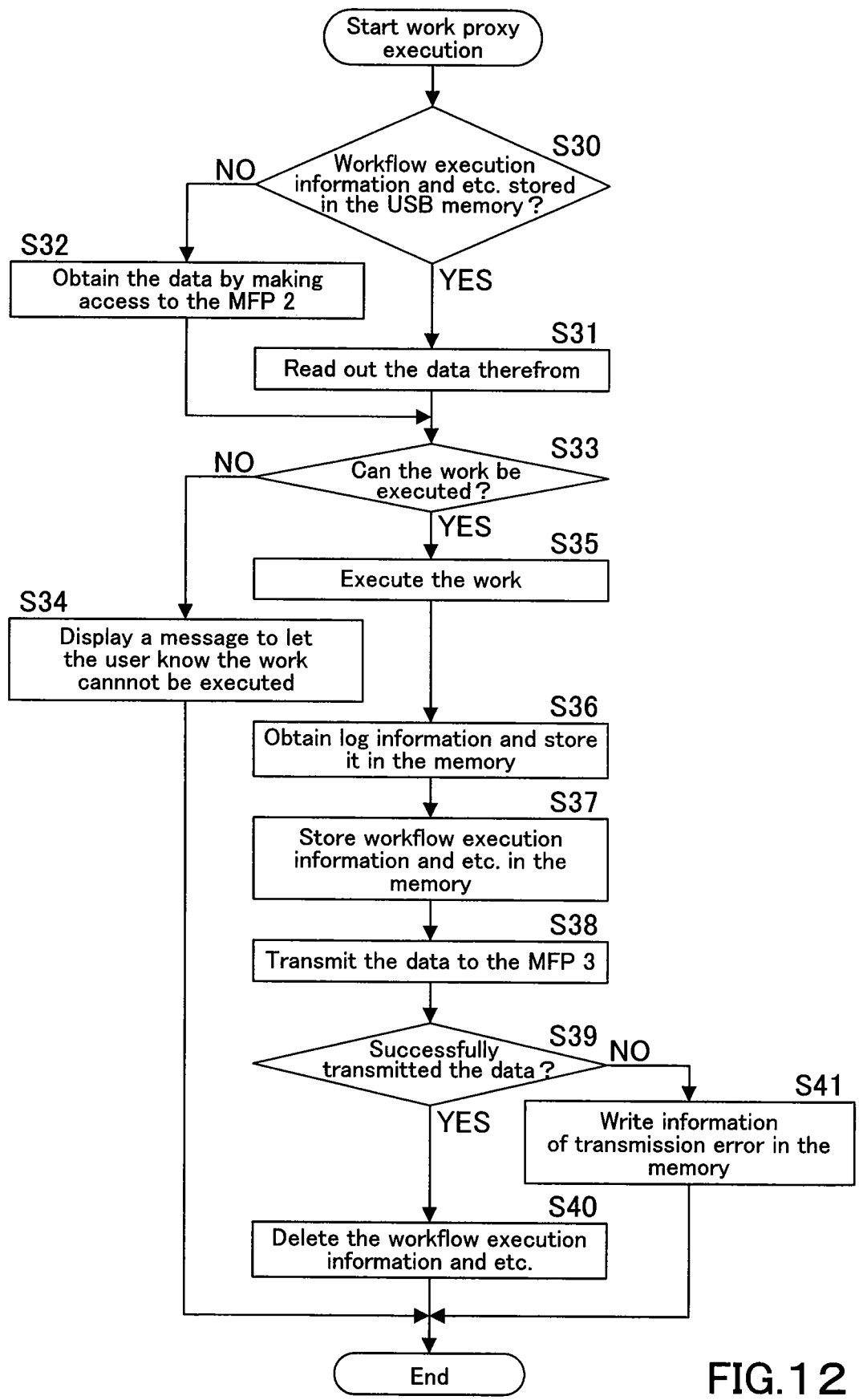
FIG. 12 is a flowchart showing a procedure executed in the proxy image processing apparatus, to execute a work by proxy.

FIG. 12 is a flowchart showing a procedure executed in the MFP 6 that is a proxy image processing apparatus, to execute a work by proxy. This procedure is executed by the CPU 11 of the MFP 6 according to a program stored in a recording medium such as the ROM 12.

In Step S30, it is judged whether or not workflow execution information and image information are stored in the USB memory 100. If those information are stored therein (YES in Step S30), the workflow execution information and etc. are read out from the USB memory 100 in Step S31, and then the routine proceeds to Step S33. If the workflow execution information and etc. are not stored therein (NO in Step S30), those information are obtained by making access to a storage location of MFP 2 according to the linkage information, in Step S32. Then the routine proceeds to Step S33.

In Step S33, it is judged whether or not the work can be executed. If it cannot be executed (NO in Step S33), a message is displayed on the display 152 of the operation panel 15 to let the user know that it cannot be executed, in Step S34. Then the routine terminates.

If the work can be executed (YES in Step S33), the work is executed by proxy in Step S35. Then in Step S36, log information is obtained and stored in the USB memory 100, and the execution result, workflow execution information indicating the works having been executed and image information are stored in the USB memory 100.

Then, the workflow execution information and the image information are transmitted to the MFP 3 on the next tier in Step S38, and it is judged in Step S39 whether or not those information are successfully transmitted.

If those information are successfully transmitted (YES in Step S39), the workflow execution information, the image information and the work control information stored in the USB memory 100 are deleted in Step S40, and then the routine terminates. If those information are not successfully transmitted (NO in Step S39), information of transmission error is written in the USB memory 100 in Step S41, and then the routine terminates. At the same time, a message is displayed on the operation panel to notify the user of transmission error.

Figure 13:
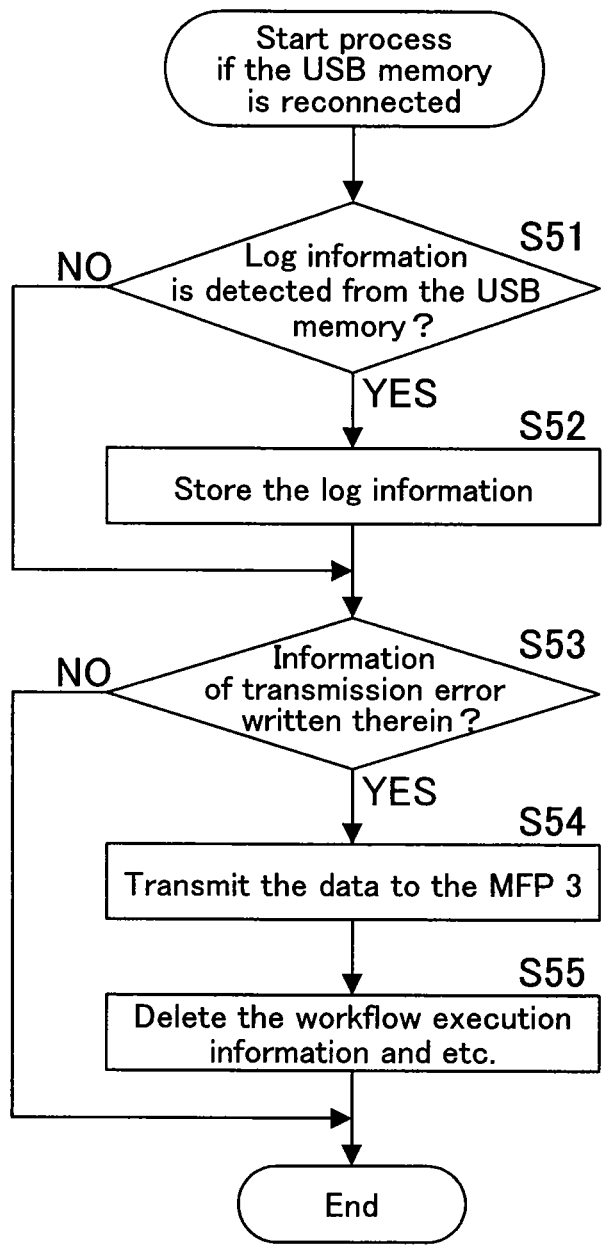
FIG. 13 is a flowchart showing a procedure executed if a USB memory is reconnected to the MFP 2.

FIG. 13 is a flowchart showing a procedure executed under the control of the CPU 11 of the MFP 2, if the user B reconnects the USB memory 100 to the portable recording medium I/F 19 of the MFP 2.

In Step S51, it is judged whether or not the log information of the work executed by proxy in the MFP 6 is stored in the USB memory 100. If the log information is stored therein (YES in Step S51), it is stored in a usual storage location such as the storage 16 in Step S52, and then the routine proceeds to Step S53. If the log information is not stored therein (NO in Step S51), the routine directly proceeds to Step S53.

In Step S53, it is judged whether or not information indicating the workflow execution information and the image information were not successfully transmitted to the MFP 3 on the next tier is written in the USB memory 100. If such information is not written therein (NO in Step S53), the routine terminates. If such information is written therein (YES in Step S53), the workflow execution information and the image information are transmitted to the MFP 3 in Step S54, and those information are deleted from the USB memory 100 in Step S55. Then the routine terminates.

As described above in this embodiment, if workflow execution information and etc. are not successfully transmitted to the MFP 3 on the next tier from the MFP 6 that is a proxy image processing apparatus, those information are transmitted from the MFP 2 that is a proper image processing apparatus then deleted from the USB memory 100, which would ensure higher security.

Described above is one embodiment of the present invention, but the present invention is not limited to this embodiment. For example, a USB memory is employed as a portable recording medium in this embodiment. Alternatively, a memory card, a CD-ROM and etc. can be employed.

Further, in this embodiment, the MFP 6 that is a proxy image processing apparatus reads out image data from a document then binds the image information to other image data received from the MFP 1, as proxy for the MFP 2. Alternatively, it can be configured such that the MFP 2 that is a proper image processing apparatus preliminarily reads out image information from a document by the scanner 14 and stores in the USB memory 100 the readout image information and other image information transmitted from the MFP 1, and then the MFP 6 that is a proxy image processing apparatus binds the two image information together.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example" and "NB" which means "note well".

What is claimed is:

1. A workflow execution system comprising:
a plurality of proper image processing apparatuses that is connected to a network and work together to execute one workflow related to image information by individually executing their own assigned works in a predetermined order; and a proxy image processing apparatus that is interconnected to the plurality of proper image processing apparatuses via the network and executes by proxy a work assigned to any of the plurality of proper image processing apparatuses, and
a proper image processing apparatus configured to execute its own assigned work, comprising:
   a proper apparatus controller that stores in a portable recording medium, work control information for executing a work assigned to the proper image processing apparatus, workflow execution information transmitted from an image processing apparatus upstream in charge of a most recent work, which indicates which works of a workflow have been executed, image information transmitted from the image processing apparatus upstream in charge of a most recent work, and information indicating an image processing apparatus downstream in charge of a next work, which executes a work after the present work is executed, and
the proxy image processing apparatus comprising:
   a judger that judges from the information stored in the portable recording medium, whether or not the work can be executed;
   a work executor that executes the work by proxy based on the information stored in the portable recording medium, if the judger judges that the work can be executed;
   a proxy apparatus controller that stores in the portable recording medium, workflow execution information including the execution result and image information, after the work execution is completed; and
a transmitter that transmits the workflow execution information and the image information to the image processing apparatus downstream in charge of a next work, according to the information indicating the image processing apparatus downstream in charge of a next work, which is stored in the portable recording medium, wherein:
the proper apparatus controller of the proper image processing apparatus stores a condition for obtaining log information from the proper image processing apparatus itself, in the portable recording medium;
the proxy apparatus controller of the proxy image processing apparatus obtains log information of the work executed by proxy, according to the condition for obtaining log information, which is stored in the portable recording medium, and then stores the log information in the portable recording medium; and
the proper image processing apparatus stores in a log information storage location of the proper image processing apparatus itself, the log information stored in the portable recording medium, if the portable recording medium is reconnected to the proper image processing apparatus.

2. The workflow execution system recited in claim 1, wherein the proxy image processing apparatus further comprises a deleter that deletes the workflow execution information, the image information and the work control information stored in the portable recording medium if the workflow execution information and the image information are successfully transmitted to the image processing apparatus downstream in charge of a next work.

3. A workflow execution system comprising:
a plurality of proper image processing apparatuses that is connected to a network and work together to execute one workflow related to image information by individually executing their own assigned works in a predetermined order; and a proxy image processing apparatus that is interconnected to the plurality of proper image processing apparatuses via the network and executes by proxy a work assigned to any of the plurality of proper image processing apparatuses, and
a proper image processing apparatus configured to execute its own assigned work, comprising:
  a proper apparatus controller that stores in a portable recording medium, work control information for executing a work assigned to the proper image processing apparatus, workflow execution information transmitted from an image processing apparatus upstream in charge of a most recent work, which indicates which works of a workflow have been executed, image information transmitted from the image processing apparatus upstream in charge of a most recent work, and information indicating an image processing apparatus downstream in charge of a next work, which executes a work after the present work is executed, and
the proxy image processing apparatus comprising:
  a judger that judges from the information stored in the portable recording medium, whether or not the work can be executed;
  a work executor that executes the work by proxy based on the information stored in the portable recording medium, if the judger judges that the work can be executed;
  a proxy apparatus controller that stores in the portable recording medium, workflow execution information including the execution result and image information, after the work execution is completed; and
  a transmitter that transmits the workflow execution information and the image information to the image processing apparatus downstream in charge of a next work, according to the information indicating the image processing apparatus downstream in charge of a next work, which is stored in the portable recording medium, wherein:
the proper apparatus controller of the proper image processing apparatus stores in the portable recording medium, linkage information directing to an information storage location of the proper image processing apparatus itself, instead of the workflow execution information and the image information, if the workflow execution information and the image information are not transmitted from the image processing apparatus upstream in charge of a most recent work; and
the work executor of the proxy image processing apparatus obtains the workflow execution information and the image information from the information storage location of the proper image processing apparatus according to the linkage information, when executes the work by proxy.
4. A workflow execution system comprising:
a plurality of proper image processing apparatuses that is connected to a network and work together to execute one workflow related to image information by individually executing their own assigned works in a predetermined order; and a proxy image processing apparatus that is interconnected to the plurality of proper image processing apparatuses via the network and executes by proxy a work assigned to any of the plurality of proper image processing apparatuses, and
a proper image processing apparatus configured to execute its own assigned work, comprising:
  a proper apparatus controller that stores in a portable recording medium, work control information for executing a work assigned to the proper image processing apparatus, workflow execution information transmitted from an image processing apparatus upstream in charge of a most recent work, which indicates which works of a workflow have been executed, image information transmitted from the image processing apparatus upstream in charge of a most recent work, and information indicating an image processing apparatus downstream in charge of a next work, which executes a work after the present work is executed, and
the proxy image processing apparatus comprising:
  a judger that judges from the information stored in the portable recording medium, whether or not the work can be executed;
  a work executor that executes the work by proxy based on the information stored in the portable recording medium, if the judger judges that the work can be executed;
  a proxy apparatus controller that stores in the portable recording medium, workflow execution information including the execution result and image information, after the work execution is completed; and
  a transmitter that transmits the workflow execution information and the image information to the image processing apparatus downstream in charge of a next work, according to the information indicating the image processing apparatus downstream in charge of a next work, which is stored in the portable recording medium, wherein:
if the proxy image processing apparatus does not successfully transmit the workflow execution information and the image information to the image processing apparatus downstream in charge of a next work after executing the work and the portable recording medium is connected to the proper image processing apparatus, the proper image processing apparatus transmits the workflow execution information and the image information to the image processing apparatus downstream in charge of a next work then deletes the workflow execution information and the image information stored in the portable recording medium.
5. A workflow execution method comprising:
storing in a portable recording medium, work control information for executing a work assigned to a proper image processing apparatus that is one of a plurality of image processing apparatuses connected to a network and work together to execute one workflow by individually executing their own assigned works in a predetermined order, workflow execution information transmitted from an image processing apparatus upstream in charge of a most recent work, which indicates which works of a workflow have been executed, image information transmitted from the image processing upstream in charge of a most recent work, and information indicating an image processing apparatus downstream in charge of a next work, which executes a work after the present work is executed;

judging from the information stored in the portable recording medium, whether or not a proxy image processing apparatus executing a work by proxy can execute the work;

executing the work by proxy based on the information stored in the portable recording medium, if it is judged that the proxy image processing apparatus can execute the work;

storing in the portable recording medium, workflow execution information including the execution result and image information, if the work execution is completed; and transmitting the workflow execution information and the image information to the image processing apparatus downstream in charge of a next work according to the information indicating the image processing apparatus downstream in charge of a next work, which is stored in the portable recording medium, further comprising:

storing a condition for obtaining log information from the proper image processing apparatus, in the portable recording medium connected to the proper image processing apparatus;

obtaining log information of the work executed by proxy by the proper image processing apparatus, according to the condition for obtaining log information, which is stored in the portable recording medium, and then storing the obtained log information in the portable recording medium connected to the proxy image processing apparatus; and storing in a log information storage location of the proper image processing apparatus, the log information stored in the portable recording medium, if the portable recording medium is reconnected to the proper image processing apparatus.

6. The workflow execution method recited in claim 5, further comprising a step of deleting the workflow execution information, the image information and the work control information stored in the portable recording medium, if the workflow execution information and the image information are successfully transmitted to the image processing apparatus downstream in charge of a next work.

7. A workflow execution method comprising:

storing in a portable recording medium, work control information for executing a work assigned to a proper image processing apparatus that is one of a plurality of image processing apparatuses connected to a network and work together to execute one workflow by individually executing their own assigned works in a predetermined order, workflow execution information transmitted from an image processing apparatus upstream in charge of a most recent work, which indicates which works of a workflow have been executed, image information transmitted from the image processing upstream in charge of a most recent work, and information indicating an image processing apparatus downstream in charge of a next work, which executes a work after the present work is executed;

judging from the information stored in the portable recording medium, whether or not a proxy image processing apparatus executing a work by proxy can execute the work;

executing the work by proxy based on the information stored in the portable recording medium, if it is judged that the proxy image processing apparatus can execute the work;

storing in the portable recording medium, workflow execution information including the execution result and image information, if the work execution is completed; and transmitting the workflow execution information and the image information to the image processing apparatus downstream in charge of a next work according to the information indicating the image processing apparatus downstream in charge of a next work, which is stored in the portable recording medium, further comprising:

storing in the portable recording medium, linkage information directing to an information storage location of the proper image processing apparatus, instead of the workflow execution information and the image information, if the workflow execution information and the image information are not transmitted to the proper image processing apparatus from the image processing apparatus upstream in charge of a most recent work; and obtaining the workflow execution information and the image information from the information storage location of the proper image processing apparatus according to the linkage information, when the proxy image processing apparatus executes the work by proxy.

8. A workflow execution method comprising:

storing in a portable recording medium, work control information for executing a work assigned to a proper image processing apparatus that is one of a plurality of image processing apparatuses connected to a network and work together to execute one workflow by individually executing their own assigned works in a predetermined order, workflow execution information transmitted from an image processing apparatus upstream in charge of a most recent work, which indicates which works of a workflow have been executed, image information transmitted from the image processing upstream in charge of a most recent work, and information indicating an image processing apparatus downstream in charge of a next work, which executes a work after the present work is executed;

judging from the information stored in the portable recording medium, whether or not a proxy image processing apparatus executing a work by proxy can execute the work;

executing the work by proxy based on the information stored in the portable recording medium, if it is judged that the proxy image processing apparatus can execute the work;

storing in the portable recording medium, workflow execution information including the execution result and image information, if the work execution is completed; and transmitting the workflow execution information and the image information to the image processing apparatus downstream in charge of a next work according to the information indicating the image processing apparatus downstream in charge of a next work, which is stored in the portable recording medium, further comprising:

transmitting the workflow execution information and the image information to the image processing apparatus downstream in charge of a next work then deleting the workflow execution information and the image information stored in the portable recording medium, if the proxy image processing apparatus does not successfully transmit the workflow execution information and the image information to the image processing apparatus downstream in charge of a next work after executing the work and the portable recording medium is connected to the proper image processing apparatus.

9. An image processing apparatus executing by proxy any of the works assigned to a respective plurality of image processing apparatuses, if the plurality of image processing apparatuses are connected to a network and work together to execute one workflow related to image information by individually executing their own assigned works in a predetermined order, and comprising:
   a connector that removably connects a portable recording medium storing in itself work control information for executing a work assigned to a proper image processing apparatus, workflow execution information transmitted from an image processing apparatus upstream in charge of a most recent work, which indicates which works of a workflow have been executed, image information transmitted from the image processing apparatus upstream in charge of a most recent work, information indicating an image processing apparatus downstream in charge of a next work, which executes a work after the present work is executed;
   a judger that judges from the information stored in the portable recording medium connected to the connector, whether or not the work can be executed;
   a work executor that executes the work by proxy based on the information stored in the portable recording medium, if it is judged that the work can be executed;
   a controller that stores in the portable recording medium, workflow execution information including the execution result and image information, after the work execution is completed; and
   a transmitter that transmits the workflow execution information and the image information to the image processing apparatus downstream in charge of a next work, according to the information indicating the image processing apparatus downstream in charge of a next work, which is stored in the portable recording medium, wherein:
   a condition for obtaining log information is stored in the portable recording medium, from the proper image processing apparatus; and
   the controller obtains log information of the work executed by proxy, according to the condition for obtaining log information, which is stored in the portable recording medium, and then stores the obtained log information in the portable recording medium.

10. The image processing apparatus recited in claim 9, further comprising a deleter that deletes the workflow execution information, the image information and the work control information stored in the portable recording medium, if the workflow execution information and the image information are successfully transmitted to the image processing apparatuses downstream in charge of a next work.

11. An image processing apparatus executing by proxy any of the works assigned to a respective plurality of image processing apparatuses, if the plurality of image processing apparatuses are connected to a network and work together to execute one workflow related to image information by individually executing their own assigned works in a predetermined order, and comprising:
   a connector that removably connects a portable recording medium storing in itself work control information for executing a work assigned to a proper image processing apparatus, workflow execution information transmitted from an image processing apparatus upstream in charge of a most recent work, which indicates which works of a workflow have been executed, image information transmitted from the image processing apparatus upstream in charge of a most recent work, information indicating an image processing apparatus downstream in charge of a next work, which executes a work after the present work is executed;
   a judger that judges from the information stored in the portable recording medium connected to the connector, whether or not the work can be executed;
   a work executor that executes the work by proxy based on the information stored in the portable recording medium, if it is judged that the work can be executed;
   a controller that stores in the portable recording medium, workflow execution information including the execution result and image information, after the work execution is completed; and
   a transmitter that transmits the workflow execution information and the image information to the image processing apparatus downstream in charge of a next work, according to the information indicating the image processing apparatus downstream in charge of a next work, which is stored in the portable recording medium, wherein:
   when executes the work by proxy, the work executor obtains the workflow execution information and the image information from an information storage location of the proper image processing apparatus according to linkage information directing to the information storage location, if there stored in the portable recording medium, the linkage information instead of the workflow execution information and the image information.

12. A work proxy execution program stored in a non-transitory computer readable recording medium to make a computer of an image processing apparatus executing by proxy any of the works assigned to a respective plurality image processing apparatuses, if the plurality of image processing apparatuses are connected to a network and work together to execute one workflow, execute:
   judging whether or not the work can be executed, from information stored in a portable recording medium, which are work control information for executing a work assigned to a proper image processing apparatus, workflow execution information transmitted from an image processing apparatus upstream in charge of a most recent work, which indicates which works of a workflow have been executed, image information transmitted from the image processing apparatus upstream in charge of a most recent work, and information indicating an image processing apparatus downstream in charge of a next work, which executes a work after the present work is executed;
   executing by proxy the work based on the information stored in the portable recording medium, if it is judged the work can be executed;
   storing in the portable recording medium, workflow execution information including the execution result and image information, after the work execution is completed; and
   transmitting the workflow execution information and the image information to the image processing apparatus downstream in charge of a next work, according to the information indicating the image processing apparatus downstream in charge of a next work, which is stored in the portable recording medium, further making the computer execute:
   obtaining log information of the work executed by proxy, according to a condition for obtaining log information stored in the portable recording medium from the proper image processing apparatus, and then storing the obtained log information in the portable recording medium.

13. The work proxy execution program recited in claim 12, further making the computer execute:

deleting the workflow execution information, the image information and the work control information stored in the portable recording medium, if the workflow execution information and the image information are successfully transmitted to the image processing apparatus downstream in charge of a next work.

14. A work proxy execution program stored in a non-transitory computer readable recording medium to make a computer of an image processing apparatus executing by proxy any of the works assigned to a respective plurality of image processing apparatuses, if the plurality of image processing apparatuses are connected to a network and work together to execute one workflow, execute:

judging whether or not the work can be executed, from information stored in a portable recording medium, which are work control information for executing a work assigned to a proper image processing apparatus, workflow execution information transmitted from an image processing apparatus upstream in charge of a most recent work, which indicates which works of a workflow have been executed, image information transmitted from the image processing apparatus upstream in charge of a most recent work, and information indicating an image processing apparatus downstream in charge of a next work, which executes a work after the present work is executed;

executing by proxy the work based on the information stored in the portable recording medium, if it is judged the work can be executed;

storing in the portable recording medium, workflow execution information including the execution result and image information, after the work execution is completed; and transmitting the workflow execution information and the image information to the image processing apparatus downstream in charge of a next work, according to the information indicating the image processing apparatus downstream in charge of a next work, which is stored in the portable recording medium, further making the computer execute:

obtaining the workflow execution information and the image information from an information storage location of the proper image processing apparatus according to linkage information directing to the information storage location when the work executor executes the work by proxy, if there stored in the portable recording medium, the linkage information instead of the workflow execution information and the image information.

* * * * *